(12) United States Patent
Kim et al.

(10) Patent No.: US 9,178,676 B2
(45) Date of Patent: Nov. 3, 2015

(54) DEVICE AND METHOD FOR MONITORING CONTROL CHANNEL IN MULTICARRIER SYSTEM

(75) Inventors: So Yeon Kim, Anyang-si (KR); Sung Ho Moon, Anyang-si (KR); Jae Hoon Chung, Anyang-si (KR); Yeong Hyeon Kwon, Anyang-si (KR); Han Gyu Cho, Anyang-si (KR)

(73) Assignee: LG Electronics Inc., Seoul (KR)

( * ) Notice: Subject to any disclaimer, the term of this patent is extended or adjusted under 35 U.S.C. 154(b) by 527 days.

(21) Appl. No.: 13/320,508

(22) PCT Filed: May 14, 2010

(86) PCT No.: PCT/KR2010/003067
§ 371 (c)(1),
(2), (4) Date: Nov. 14, 2011

(87) PCT Pub. No.: WO2010/131926
PCT Pub. Date: Nov. 18, 2010

(65) Prior Publication Data
US 2012/0078933 A1    Mar. 29, 2012

Related U.S. Application Data

(60) Provisional application No. 61/178,053, filed on May 14, 2009, provisional application No. 61/285,547, filed on Dec. 11, 2009, provisional application No. 61/285,550, filed on Dec. 11, 2009, provisional (Continued)

(30) Foreign Application Priority Data

May 14, 2010    (KR) .................. 10-2010-0045372

(51) Int. Cl.
H04J 7/00      (2006.01)
H04L 5/00      (2006.01)
H04L 27/26    (2006.01)

(52) U.S. Cl.
CPC ............ H04L 5/0053 (2013.01); H04L 5/0007 (2013.01); H04L 5/0035 (2013.01); H04L 27/2602 (2013.01); H04L 5/0062 (2013.01)

(58) Field of Classification Search
CPC ................................................ H04B 7/2656
USPC .......................................... 370/915
See application file for complete search history.

(56) References Cited

U.S. PATENT DOCUMENTS 5,726,978 A * 3/1998 Frodigh et al. ............. 370/252
6,947,500 B1 * 9/2005 Carrozza et al. ............ 375/340

(Continued)

FOREIGN PATENT DOCUMENTS

WO    WO 2009/041779 A1    4/2009

OTHER PUBLICATIONS

3GPP, 'Control Channel Design for the Support of Wider Bandwith for LTE-Advanced', 3GPP TSG RAN WG1 meeting #57, R1-091923, May 4-6, 2009.

(Continued)

*Primary Examiner* — Hosain Alam
*Assistant Examiner* — Bruce Witzenburg
(74) *Attorney, Agent, or Firm* — Birch, Stewart, Kolsasch & Birch, LLP

(57) ABSTRACT

Provided are a method and a device for monitoring the control channel in a multicarrier system. The terminal determines a plurality of terminal-specific search spaces corresponding respectively to a plurality of scheduled component carriers in a control region within a subframe. The terminal monitors a downlink control channel for the scheduled component carriers corresponding respectively to the plurality of terminal-specific search spaces.

18 Claims, 16 Drawing Sheets

Related U.S. Application Data application No. 61/292,435, filed on Jan. 5, 2010, provisional application No. 61/298,214, filed on Jan. 26, 2010, provisional application No. 61/307,861, filed on Feb. 25, 2010, provisional application No. 61/309,821, filed on Mar. 2, 2010, provisional application No. 61/318,791, filed on Mar. 30, 2010, provisional application No. 61/323,877, filed on Apr. 14, 2010, provisional application No. 61/327,080, filed on Apr. 22, 2010, provisional application No. 61/328,607, filed on Apr. 27, 2010.

(56) References Cited

U.S. PATENT DOCUMENTS

| | | |
|---|---|---|
| 2006/0233150 A1 | 10/2006 | Cherian |
| 2008/0013480 A1* | 1/2008 | Kapoor et al. ............... 370/328 |
| 2010/0061345 A1* | 3/2010 | Wengerter et al. ........... 370/335 |
| 2011/0142151 A1* | 6/2011 | Zhang et al. ................. 375/260 |

OTHER PUBLICATIONS

3GPP, 'DL Control Channel Scheme for LTE-A', 3GPP TSG RAN WG1 meeting #55bis, R1-090191, Jan. 12-16, 2009.

* cited by examiner

DEVICE AND METHOD FOR MONITORING CONTROL CHANNEL IN MULTICARRIER SYSTEM

This application is a National Phase of PCT/KR2010/003067 filed on May 14, 2010, which claims priority under 35 USC 119(e) to U.S. Provisional Application Nos. 61/178,053, 61/285,547, 61/285,550, 61/292,435, 61/298,214, 61/307,861, 61/309,821, 61/318,791, 61/323,877, 61/327,080 and 61/328,607 filed on May 14, 2009, Dec. 11, 2009, Dec. 11, 2009, Jan. 5, 2010, Jan. 26, 2010, Feb. 25, 2010, Mar. 2, 2010, Mar. 30, 2010, Apr. 14, 2010, Apr. 22, 2010 and Apr. 27, 2010, respectively, and under 35 USC 119(a) to Patent Application No. 10-2010-0045372 filed in Republic of Korea, on May 14, 2010. All of these applications are hereby expressly incorporated by reference into the present application.

TECHNICAL FIELD

The present invention relates to wireless communication. More specifically, the present invention relates to an apparatus and method for monitoring a control channel in a wireless communication system.

BACKGROUND ART

Although bandwidth is set differently between uplink and downlink, only one carrier is generally considered in the conventional wireless communication system. The carrier is defined by a center frequency and a bandwidth. A multiple carrier system uses a plurality of component carriers (CCs) having narrow bandwidth than full bandwidth.

A multiple carrier system can support backward compatibility for legacy systems and also increase data rate significantly through multiple carriers.

Long term evolution (LTE) based on 3rd Generation Partnership Project (3GPP) Technical Specification (TS) Release 8 is a promising, next-generation mobile communication standard. A 3GPP LTE system is a single carrier system supporting only one bandwidth (i.e., one CC) among 1.4, 3, 5, 10, and 20 MHz. However, LTE-Advanced (LTE-A), which is an evolved version of the 3GPP LTE, employs multiple carriers.

In a single carrier system, control channels and data channels are designed based on a single carrier. However, it can be inefficient if a multiple carrier system employs the channel structure of a single carrier system as it is.

DISCLOSURE

Technical Problem

The present invention provides a method and an apparatus for monitoring a control channel in a multiple carrier system.

The present invention also provides a method and an apparatus of transmitting a control channel in a multiple carrier system.

Technical Solution

In an aspect, a method for monitoring a control channel in a multiple carrier system is provided. The method includes determining a plurality of UE-specific search spaces corresponding to a plurality of scheduled component carriers in a control region of a subframe, monitoring a downlink control channel for a scheduled component carrier corresponding to each of the plurality of UE-specific search spaces, and receiving downlink control information about a scheduled component carrier on a downlink control channel which is successfully decoded, wherein a start point for each of the plurality of UE-specific search spaces is determined based on information about corresponding scheduled component carrier.

The start point of each of the plurality of UE-specific search spaces may be determined based on the number of component carriers available.

The start point of each of the plurality of UE-specific search spaces may be determined based on the total number of scheduled component carriers.

The start point of each of the plurality of UE-specific search spaces may be determined based on index of corresponding scheduled component carrier.

The plurality of UE-specific search spaces all may have the same size.

At least one of the plurality of UE-specific search spaces may have a different size from those of the remaining UE-specific search spaces.

In another aspect, a user equipment (UE) for monitoring a control channel in a multiple carrier system includes a radio frequency unit configured to transmit and receive radio signals, and a processor operatively connected to the radio frequency unit and configured to determine a plurality of UE-specific search spaces corresponding to a plurality of scheduled component carriers in a control region of a subframe, monitor a downlink control channel for a scheduled component carrier corresponding to each of the plurality of UE-specific search spaces, and receive downlink control information about a scheduled component carrier on a downlink control channel which is successfully decoded, wherein a start point for each of the plurality of UE-specific search spaces is determined based on information about corresponding scheduled component carrier.

Advantageous Effects

Since control channels for multiple component carriers can be scheduled in a single subframe, a probability of control channel blocking can be reduced.

MODE FOR INVENTION

A user equipment (UE) can be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) generally a fixed station that communicates with the UE and may be referred to as another terminology, such as an evolved node-B (eNB), a base transceiver system (BTS), an access point, etc.

Each base station provides a communication service for a particular geographical region (generally referred to as a cell). A cell can be further divided into a plurality of regions (referred to as sectors).

Hereinafter, downlink (DL) implies communication from the BS to the UE while uplink (UL) from the UE and the BS. In DL, a transmitter may be a part of the BS and a receiver may be a part of the UE. On the other hand, in UL, the transmitter may be a part of the UE and the receiver may be a part of the BS.

Figure 1:
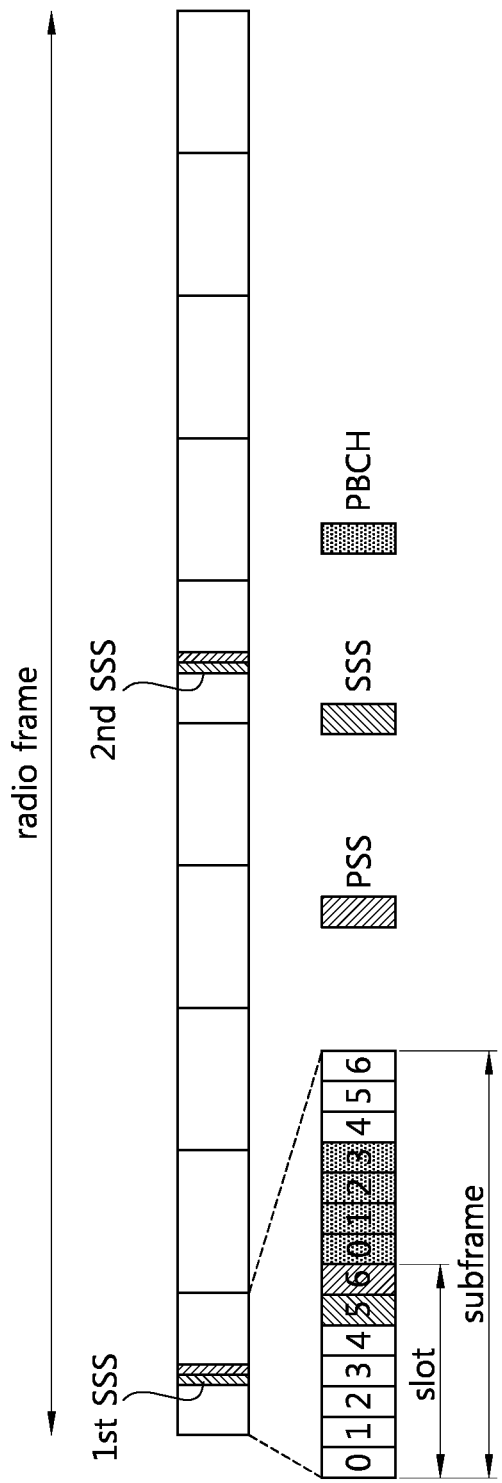
FIG. 1 illustrates the structure of a radio frame in a 3GPP LTE.

FIG. 1 illustrates the structure of a radio frame in a 3GPP LTE. The section 6 of 3GPP TS 36.211 V8.5.0 (2008-12) "Evolved Universal Terrestrial Radio Access (E-UTRA); Physical Channel and Modulation (Release 8)" may be incorporated herein by reference. A radio frame consists of 10 subframes indexed with 0 to 9. One subframe consists of 2 slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in time domain. Since the 3GPP LTE uses orthogonal frequency division multiple access (OFDMA) in DL, the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol duration, etc.

Although it is described that one slot includes 7 OFDM symbols for example, the number of OFDM symbols included in one slot may vary depending on a length of a cyclic prefix (CP). According to 3GPP TS 36.211 V8.5.0 (2008-12), in case of a normal CP, one subframe includes 7 OFDM symbols, and in case of an extended CP, one subframe includes 6 OFDM symbols.

A primary synchronization signal (PSS) is transmitted to the last OFDM symbol of a first (first slot of the first subframe which has an index 0) and an eleventh slot (first slot of the sixth subframe which has an index 5). The PSS is used to obtain OFDM symbol synchronization or slot synchronization, and is related to a physical identity (ID). The primary synchronization code (PSC) is a sequence used for the PSS, and the 3GPP LTE uses three PSCs. One of the three PSCs is transmitted to the PSS according to the cell ID. The same PSC is used for each of the last OFDM symbol of the first and the 11-the slot.

A secondary synchronization signal (SSS) comprises a first SSS and a second SSS. The first SSS and the second SSS are transmitted from an OFDM symbol contiguous with the OFDM symbol to which the PSS is transmitted. The SSS is used for obtaining frame synchronization. The SSS is used for obtaining a cell ID along with the PSS. The first SSS and the second SSS use secondary synchronization codes (SSCs) different from each other. Each of the first SSS and the second SSS includes 31 subcarriers. On SSC has a length of 31 and two SSCs are included in the first SSS and the second SSS.

A physical broadcast channel (PBCH) is transmitted from preceding four OFDM symbols of the second slot of the first subframe. The PBCH carries system information essential for communication between the UE and the BS, and the system information transmitted through the PBCH is referred to as master information block (MIB). On the other hand, the system information transmitted to a physical downlink shared channel (PDSCH) indicated by a physical downlink control channel (PDCCH) is referred to as system information block (SIB).

As specified in the 3GPP TS36.211 V8.5.0 (2008-12), physical channels of the LTE can be classified into a data channel and a control channel, where the data channel includes a physical downlink shared channel (PDSCH) and a physical uplink shared channel (PUSCH); and the control channel includes a physical downlink control channel, a physical control format indicator channel, a physical hybrid-ARQ indicator channel (PHICH), and a physical uplink control channel.

Figure 2:
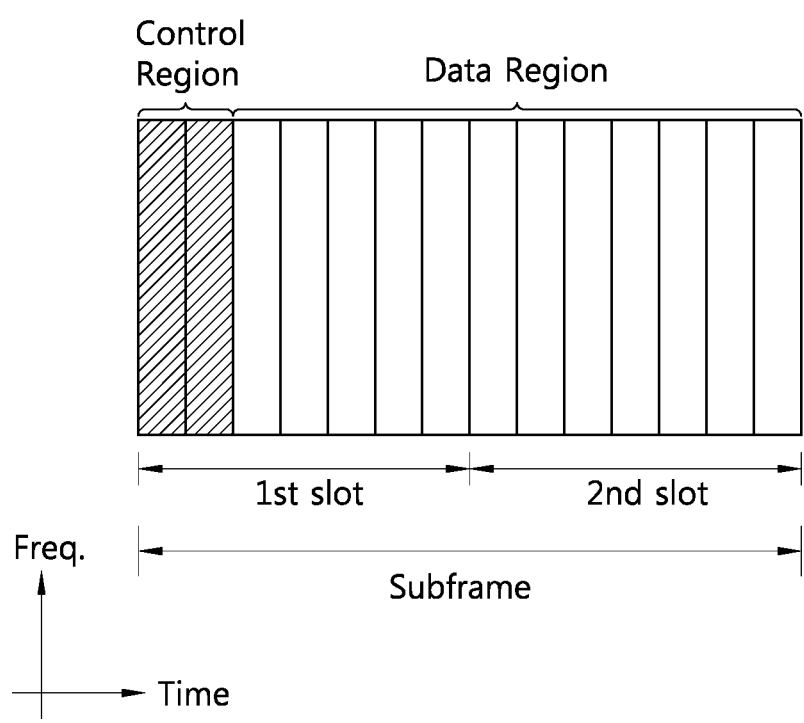
FIG. 2 is a diagram showing the structure of a downlink subframe in a 3GPP LTE.

FIG. 2 is a diagram showing the structure of a downlink subframe in a 3GPP LTE. A subframe includes a control region and a data region in time domain. The control region can include up to three preceding OFDM symbols of a first slot in the sub frame. The number of OFDM symbols included in the control region may vary. A PDCCH is allocated to the control region while a PDSCH is allocated to the data region.

A resource block (RB) is a resource allocation unit, and includes a plurality of subcarriers in one slot. For example, if one slot includes seven OFDM symbols in the time domain and an RB includes 12 subcarriers in the frequency domain, one RB can include 7*12 resource elements (REs).

A physical control format indicator channel (PCFICH) transmitted from a first OFDM symbol of the subframe carries a control format indicator (CFI) regarding the number of OFDM symbols (i.e., the size of the control region) used for transmission of control channels in the subframe. The UE first receives the CFI over the PCFICH and then monitors the PDCCH.

A PHICH carries an positive-acknowledgement (ACK)/negative-acknowledgement (NACK) signal for uplink hybrid automatic repeat request (HARQ). The ACK/NACK signal for uplink data transmitted by the UE is transmitted on the PHICH.

Control information transmitted through the PDCCH is referred to as downlink control information (DCI). The DCI may include resource allocation of the PDSCH (this is referred to as a downlink grant), resource allocation of a PUSCH (this is referred to as an uplink grant), a set of transmit power control commands for individual UEs in any UE group and/or activation of a voice over Internet protocol (VoIP).

Figure 3:
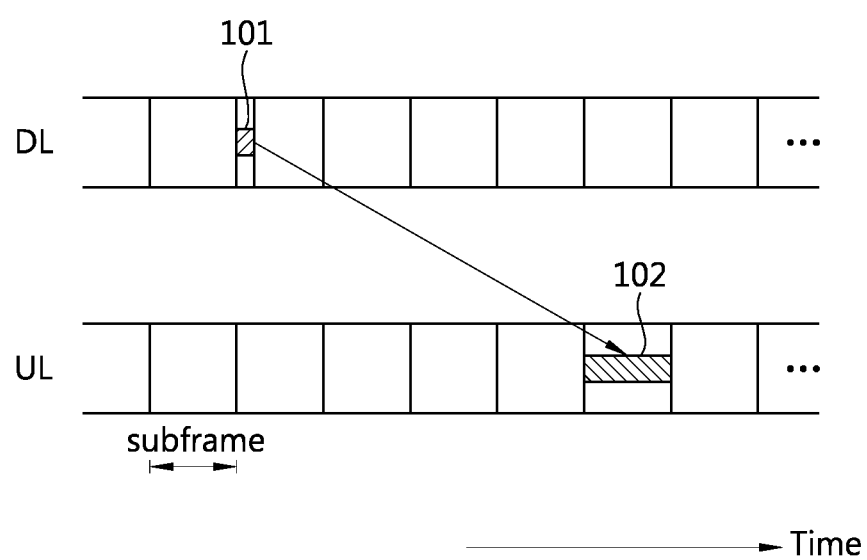
FIG. 3 is an exemplary diagram showing the transmission of uplink data.

FIG. 3 is an exemplary diagram showing the transmission of uplink data. A UE receives an uplink resource assignment on a PDCCH 101 by monitoring PDCCHs in a downlink subframe. The UE transmits an uplink data packet on a PUSCH 102 which can be constructed by using the uplink resource assignment.

Figure 4:
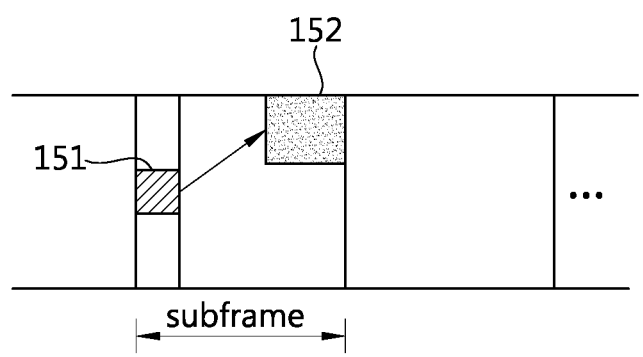
FIG. 4 is an exemplary diagram shown the reception of downlink data.

FIG. 4 is an exemplary diagram showing the reception of downlink data. A UE receives a downlink data packet on a PDSCH 152 indicated by a PDCCH 151. The UE receives a downlink resource assignment on the PDCCH 151 by monitoring PDCCHs in a downlink subframe. The UE receives the downlink data packet on the PDSCH 152 indicated by the downlink resource assignment.

Figure 5:
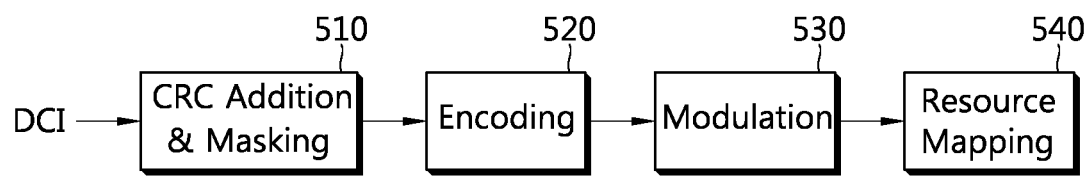
FIG. 5 is a block diagram showing the construction of a PDCCH.

FIG. 5 is a block diagram showing a structure of a PDCCH. A BS determines a PDCCH format according to DCI to be transmitted to a UE. Thereafter, the BS attaches a cyclic redundancy check (CRC) to the DCI, and masks a unique identifier (referred to as a radio network temporary identifier (RNTI)) to the CRC according to an owner or usage of the PDCCH (block 510).

If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC.

When the C-RNTI is used, the PDCCH carries control information for a specific UE (this is referred to as UE-specific control information), and when other RNTIs are used, the PDCCH carries common control information received by all or a plurality of UEs in a cell.

The CRC-attached DCI is encoded to generate coded data (block 520). Encoding includes channel encoding and rate matching.

The coded data is modulated to generate modulation symbols (block 530).

The modulation symbols are mapped to physical resource elements (REs) (block 540). The modulation symbols are respectively mapped to the REs.

Figure 6:
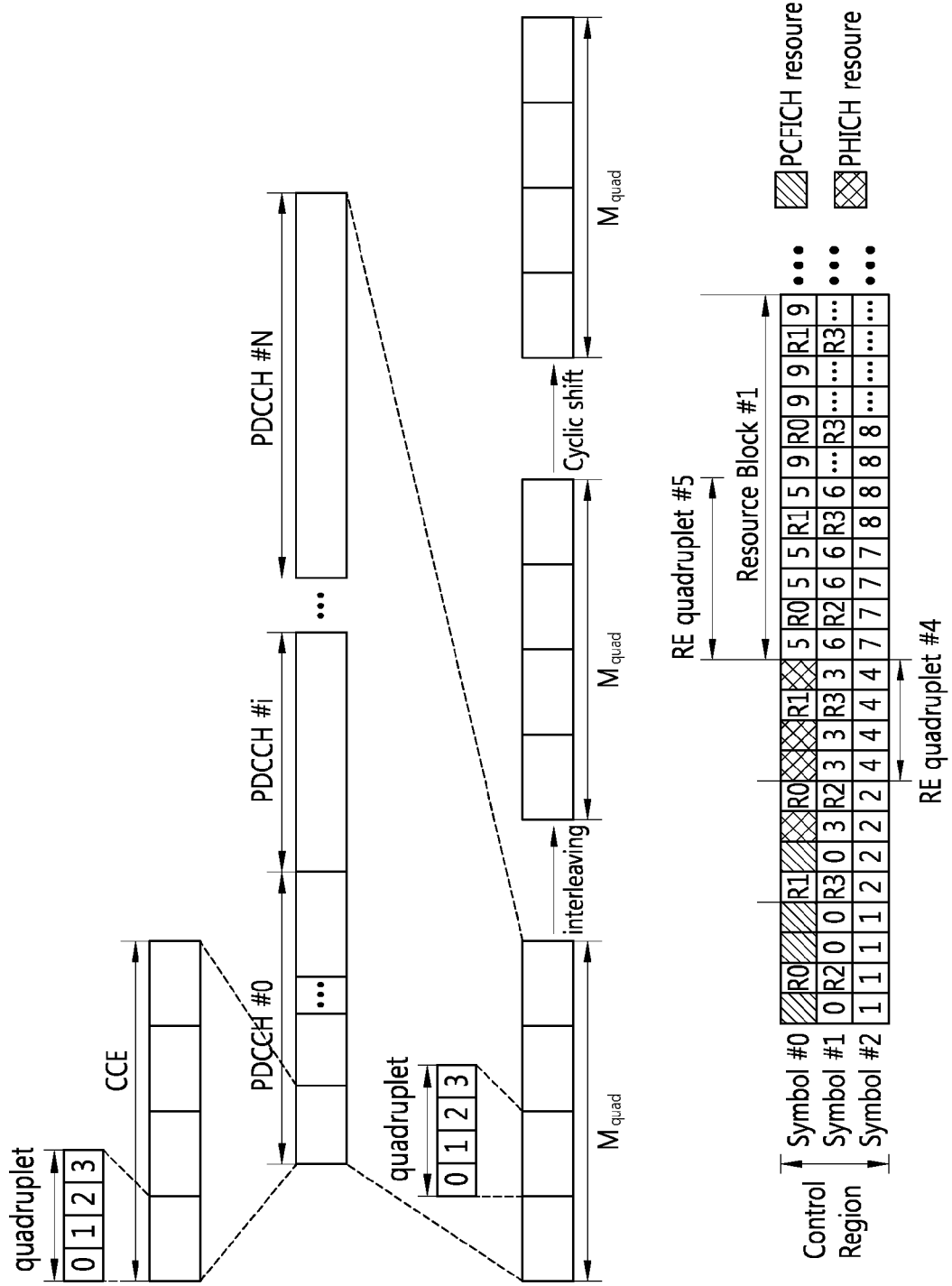
FIG. 6 is a diagram showing an example of resource mapping of a PDCCH.

FIG. 6 shows exemplary resource mapping of a PDCCH. This can refer to the section 6.8 of 3GPP TS 36.211 V8.5.0 (2008-12). R0 denotes a reference signal of a first antenna, R1 denotes a reference signal of a second antenna, R2 denotes a reference signal of a third antenna, and R3 denotes a reference signal of a fourth antenna.

A control region in a subframe includes a plurality of control channel elements (CCEs). The CCE is a logical allocation unit used to provide the PDCCH with a coding rate depending on a radio channel state, and corresponds to a plurality of resource element groups (REGs). An REG includes a plurality of resource elements. According to a relationship between the number of CCEs and the coding rate provided by the CCEs, a PDCCH format and a possible number of bits of the PDCCH are determined.

One REG (indicated by a quadruple in FIG. 6) includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

A control channel including one or more CCEs performs interleaving in unit of REG unit, and is mapped to a physical resource after performing cyclic shift based on a cell identifier (ID).

Figure 7:
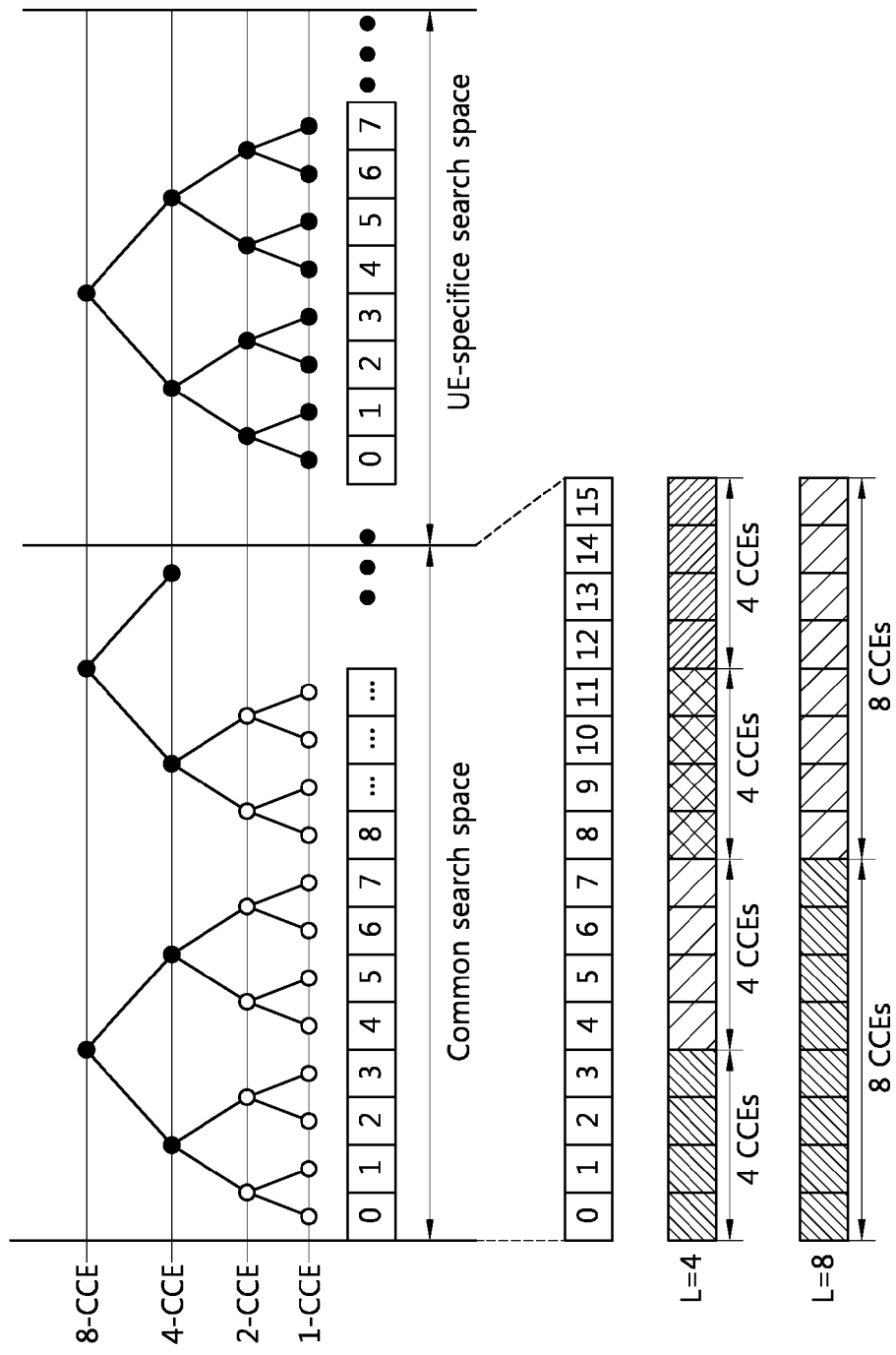
FIG. 7 is an exemplary diagram showing the monitoring of a PDCCH.

FIG. 7 shows exemplary monitoring of a PDCCH. This can refer to the section 9 of 3GPP TS 36.213 V8.5.0 (2008-12). The 3GPP LTE uses blind decoding for PDCCH detection. In the blind decoding, a specific identifier is de-masked from a CRC of a PDCCH (referred to as a candidate PDCCH), and then CRC error checking is performed to determine whether the PDCCH is a control channel of an entity performing the blind decoding. A UE has no information about which position in the control region the PDCCH of the UE is transmitted from and which CCE aggregation level or DCI format is used for the transmission.

A plurality of PDCCHs can be transmitted in one subframe. A UE monitors a plurality of PDCCHs in every subframe. Monitoring is an operation of attempting PDCCH decoding by the UE according to a format of the monitored PDCCH.

The 3GPP LTE uses a search space to reduce an overload caused by blind decoding. The search space may be referred to as a monitoring set of CCEs for PDCCH. The UE monitors the PDCCH in the corresponding search space.

The search space is classified into a common search space and a UE-specific search space. The common search space is a space for searching for a PDCCH having common control information and consists of 16 CCEs indexed with 0 to 15. The common search space supports a PDCCH having CCE aggregation levels of {4, 8}. In the common search space, however, a PDCCH for UE-specific control information (e.g. DCI format 0, 1A) can also be transmitted. The UE-specific search space supports a PDCCH having CCE aggregation levels of {1, 2, 4, 8}.

Table 1 shows the number of PDCCH candidates to be monitored by a UE.

TABLE 1

| Search Space Type | Aggregation level L | Size [In CCEs] | Number of PDCCH candidates | DCI formats |
|---|---|---|---|---|
| UE-specific | 1 | 6 | 6 | 0, 1, 1A, 1B, |
| | 2 | 12 | 6 | 1D, 2, 2A |
| | 4 | 8 | 2 | |
| | 8 | 16 | 2 | |
| Common | 4 | 16 | 4 | 0, 1A, 1C, |
| | 8 | 16 | 2 | 3/3A |

The size of the search space is defined in the Table 1, and the starting position of the search space is different between the UE-specific search space and common search space. The starting position of the common search space is fixed regardless of subframe, but the starting position of the UE-specific search space may be determined every subframe and may be obtained based on a UE's identifier (e.g., C-RNTI), a CCE aggregation level and/or the slot number in the subframe. The UE-specific search space may be overlapped with the common search space if the starting position of the UE-specific search space is in the common search space.

In a aggregation level L∈{1, 2, 3, 4}, a search space $S^{(L)}_k$ is defined as a set of PDCCH candidates. A CCE corresponding to a PDCCH candidate m of the search space S(L)k is expressed as shown:

$$L \cdot \{(Y_k+m) \bmod \lfloor N_{CCE,k}/L \rfloor\}+i, \qquad \text{[Equation 1]}$$

where i=0, 1, ..., L−1, m=0, ..., $M^{(L)}$−1 and $N_{CCE,k}$ is the total number of CCEs that can be used for transmission of PDCCHs in the control region of a subframe k. The control region includes a set of CCEs numbered from 0 to $N_{CCE,k}$−1. $M^{(L)}$ is the number of PDCCH candidates from a CCE aggregation level L in a given search space. In a common search space, $Y_k$ is set to zero for two aggregation levels of L=4 and L=8. In the UE-specific search space of the aggregation level L, the variable $Y_k$ is defined as shown:

$$Y_k=(A \cdot Y_{k-1}) \bmod D, \qquad \text{[Equation 2]}$$

where $Y_{-1} = n_{RNTI} \neq 0$; A=39827; D=65537; k=floor($n_s/2$); and $n_s$ is the slot number in a radio frame.

When the UE monitors the PDCCH by using a C-RNTI, the DCI format and the search space to be monitored are determined according to a transmission mode of the PDSCH. The following table shows an example of PDCCH monitoring where a C-RNTI is allocated.

TABLE 2

| Transmission mode | DCI Format | Search Space | Transmission mode of PDSCH according to PDCCH |
|---|---|---|---|
| Mode 1 | DCI Format 1A | Common and UE-Specific | Single antenna port, port 0 |
| | DCI Format 1 | UE-Specific | Single antenna port, port 1 |
| Mode 2 | DCI Format 1A | Common and UE-Specific | Transmit diversity |
| | DCI Format 1 | UE-Specific | Transmit diversity |
| Mode 3 | DCI Format 1A | Common and UE-Specific | Transmit diversity |
| | DCI Format 2A | UE-Specific | CDD (Cyclic Delay Diversity) or Transmit diversity |
| Mode 4 | DCI Format 1A | Common and UE-Specific | Transmit diversity |
| | DCI Format 2 | UE-Sepcific | Closed-loop spatial multiplexing |
| Mode 5 | DCI Format 1A | Common and UE-Specific | Transmit diversity |
| | DCI Format 1D | UE-Specific | MU-MIMO (Multi-user Multiple Input Multiple Output) |
| Mode 6 | DCI Formay 1A | Common and UE-Specific | Transmit diversity |
| | DCI Format 1B | UE-Specific | Closed-loop spatial multiplexing |
| Mode 7 | DCI Format 1A | Common and UE-Specific | If the number of PBCH transmission ports is 1, single antenna port, port 0; otherwise, transmit diversity |
| | DCI Format 1 | UE-Specific | Single antenna port, port 5 |
| Mode 8 | DCI Format 1A | Common and UE-Specific | If the number of PBCH transmission ports is 1, single antenna port, port 0; otherwise, transmit diversity |
| | DCI Format 2B | UE-Specific | Dual layer transmission (port 7 or 8) or single antenna port, port 7 or 8 |

Table 3 illustrates the usage of DCI format.

TABLE 3

| DCI Format | Description |
|---|---|
| DCI Format 0 | Used for PUSCH scheduling |
| DCI Format 1 | Used for scheduling of one PDSCH codeword |
| DCI Format 1A | Used for compact scheduling of one PDSCH codeword and random access process |
| DCI Format 1B | Used for compact scheduling of one PDSCH codeword having free-coding information |
| DCI Format 1C | Used for very compact scheduling of one PDSCH codeword |
| DCI Format 1D | Used for compact scheduling of one PDSCH codeword having free-coding and power offset information |
| DCI Format 2 | Used for PDSCH scheduling of UEs cconfigured as closed loop spatial multiplexing |
| DCI Format 2A | Used for PDSCH scheduling of UEs configured as open-loop spatial multiplexing |
| DCI Format 3 | Used for transmission of TPC command of PUCCH and PUSCH having two-bit power adjustment |
| DCI Format 3A | Used for transmission of TPC command of PUCCH and PPUSCH having one-bit power adjustment |

Now, a multiple carrier system will be described.

The 3GPP LTE system supports a case where downlink bandwidth and uplink bandwidth are set differently under the premise that one component carrier (CC) is used. This implies that the 3GPP LTE is supported only for a case where the downlink bandwidth and the uplink bandwidth are equal to or different from each other in a situation where one CC is defined for each of a downlink and an uplink. For example, the 3GPP LTE may support up to 20 MHz, and supports only one CC for the uplink and the downlink even if the uplink bandwidth and the downlink bandwidth may be different from each other.

Spectrum aggregation (also referred to as bandwidth aggregation or carrier aggregation) is for supporting a plurality of CCs. The spectrum aggregation is introduced to support an increasing throughput, to prevent cost rising caused by introduction of a broadband radio frequency (RF) device, and to ensure compatibility with legacy systems. For example, when five CCs are assigned with a granularity of a carrier unit having bandwidth of 20 MHz, bandwidth of up to 100 MHz can be supported.

The spectrum aggregation can be classified into contiguous spectrum aggregation achieved between consecutive carriers in frequency domain and non-contiguous spectrum aggregation achieved between discontinuous carriers. The number of carriers aggregated in downlink may be different from the number of carriers aggregated in uplink. Symmetric aggregation is achieved when the number of downlink carriers is equal to the number of uplink carriers. Asymmetric aggregation is achieved when the number of downlink carriers is different from the number of uplink carriers.

CCs may have different sizes (i.e., bandwidths). For example, when five CCs are used to configure a band of 70 MHz, the band can be composed of 5 MHz carrier (CC #0)+20 MHz carrier (CC #1)+20 MHz carrier (CC #2)+20 MHz carrier (CC #3)+5 MHz carrier (CC #4).

Figure 8:
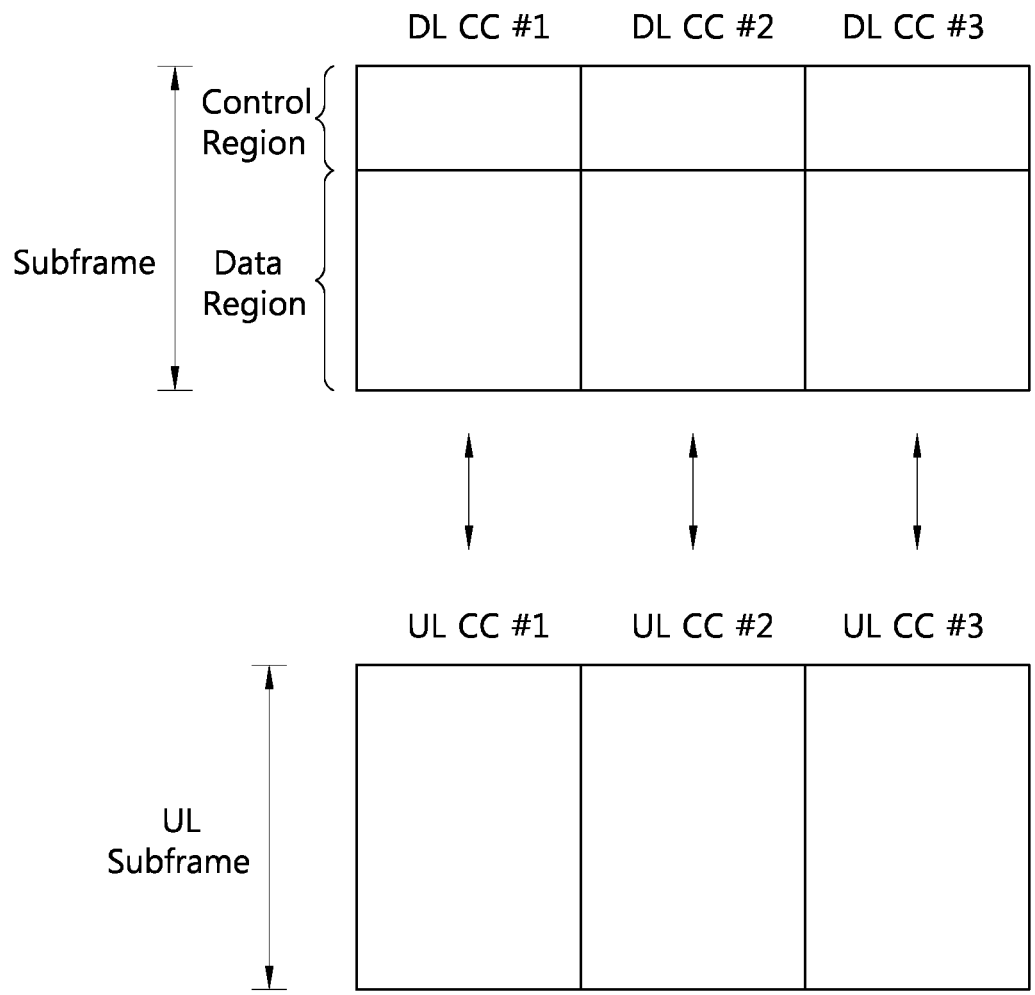
FIG. 8 is one example of multiple carriers.

FIG. 8 is one example of multiple carriers. The example shows three DL CCs and UL CCs respectively, but is not limited to the number above. Each DL CC transmits a PDCCH and a PDSCH independently; and each UL CC transmits a PUCCH and a PUSCH independently.

Hereinafter, a multiple carrier system implies a system supporting multiple carriers based on spectrum aggregation. In a multiple carrier system, contiguous spectrum aggregation and/or non-contiguous spectrum aggregation can be used; also, either of symmetric aggregation and asymmetric aggregation can be used.

In a multiple carrier system, a linkage can be defined between a DL CC and a UL CC. A linkage can be configured through E-UTRA absolute radio frequency channel number (EARFCN) information included in downlink system information and is configured by using a fixed relationship between DL/UL Tx/Rx separation. A linkage implies a relationship mapping between a DL CC through which a PDCCH carrying a UL grant is transmitted and a UL CC using the UL grant. Also, a linkage may imply a relationship mapping between a DL CC (or UL CC) through which data for HARQ are transmitted and a UL CC (or DL CC) through which HARQ ACK/NACK signal is transmitted. A BS can inform a UE of linkage information as part of a upper layer message such as RRC message or as part of system information. The linkage between a DL CC and a UL CC can be fixed but can be varied between cells/UEs.

Separate coding refers to a case where a PDCCH can carry control information regarding a resource assignment for a PDSCH/PUSCH corresponding to one carrier. That is, the PDCCH and the PDSCH; and the PDCCH and the PUSCH correspond to each other in the one-to-one manner. Joint coding refers to a case where one PDCCH can carry a resource assignment for PDSCHs/PUSCHs of a plurality of CCs. One PDCCH can be transmitted through one CC or through a plurality of CCs.

For clarity, PDCCH-PDSCH relation for downlink transmission is disclosed herein for separate coding but the present invention can be applied to PDCCH-PUSCH relationship for uplink transmission.

In a multiple carrier system, two methods can be used for CC scheduling.

In a first method, a pair of PDCCH-PDSCH is transmitted from one CC. This CC is referred to as a self-scheduling CC, which implies that a UL CC through which a PUSCH is transmitted becomes a CC linked to a DL CC through which the corresponding PDCCH is transmitted. In other words, the PDCCH either allocates a PDSCH resource on the same CC or allocates a PUSCH resource on the linked UL CC.

In a second method, independently of a DL CC through which a PDCCH is transmitted, determined is a DL CC through which a PDSCH is transmitted or a UL CC through which a PUSCH is transmitted. That is, the PDCCH and the PDSCH are transmitted from separate DL CCs or a PUSCH is transmitted through a UL CC not linked to the DL CC through which the PDCCH is transmitted, which is referred to as cross-carrier scheduling. The CC through which the PDCCH is transmitted is called a PDCCH cross-carrier, a monitoring cross-carrier, or a scheduling cross-carrier; the CC through which the PDSCH/PUSCH is transmitted is called a PDSCH/PUSCH cross-carrier or a scheduled cross-carrier.

Cross-carrier scheduling can be activated/deactivated for each UE and a cross-carrier scheduling activated UE can receive DCI in which a CIF is included. The UE can figure out which scheduled CC the control information is about, to which the PDCCH received from a CIF included in the DCI correspond.

A DL-UL linkage predefined by the cross-carrier scheduling can be overridden. That is, the cross-carrier scheduling can be used to schedule a different CC rather than the linked CC irrespective of the DL-UL linkage.

Figure 9:
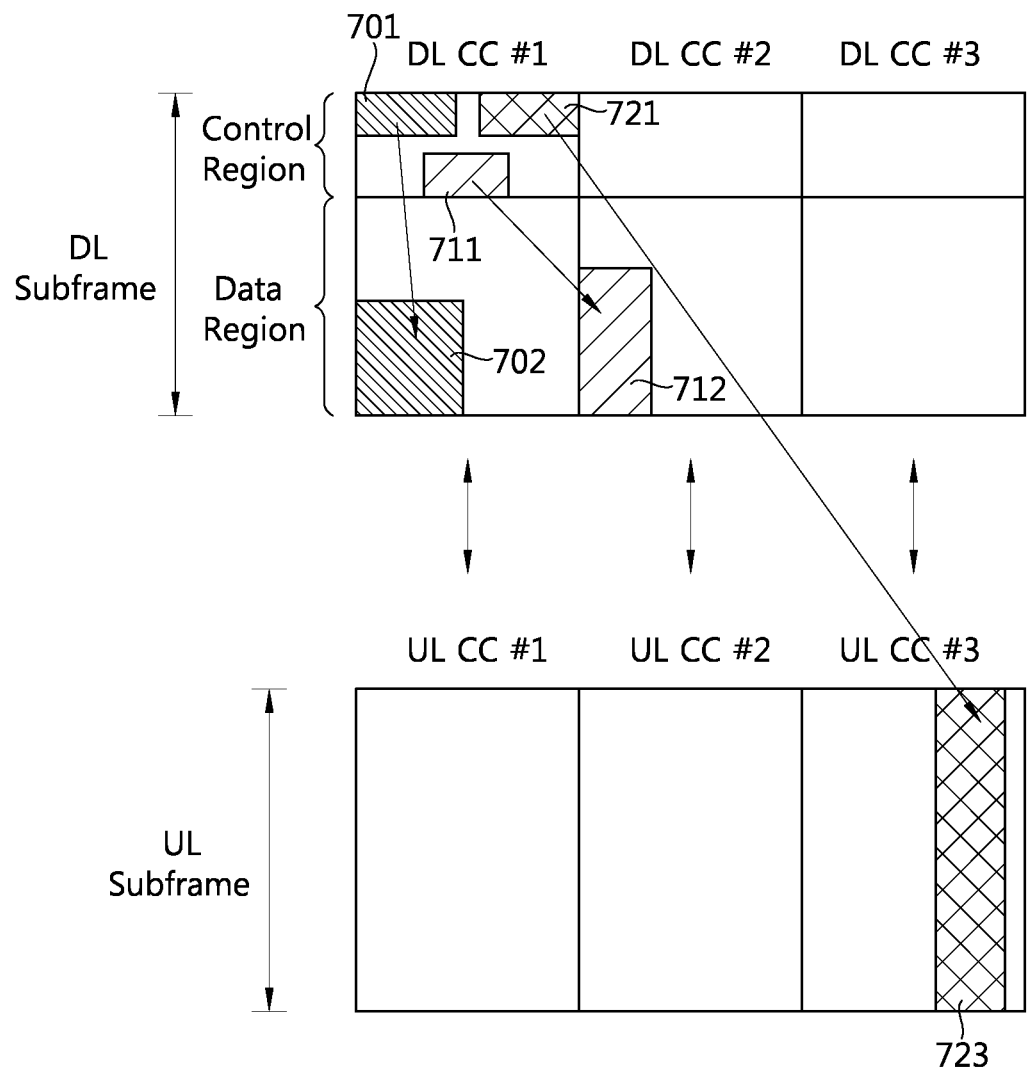
FIG. 9 is one example of cross-carrier scheduling.

FIG. 9 is one example of cross-carrier scheduling. It is assumed that DL CC #1 is linked to UL CC #1; DL CC #2 is linked to UL CC #2; and DL CC #3 is linked to UL CC #3.

A first PDCCH 701 of DL CC #1 carries DCI about a PDSCH 702 of the same DL CC #1. A second PDCCH 711 of the DL CC #1 carries DCI about a PDSCH 712 of DL CC #2. A third PDCCH 721 of the DL CC #1 carries DCI about a PUSCH 722 of UL CC #3 which is not set up for linkage.

For cross-carrier scheduling, the DCI of a PDCCH can include a carrier indicator field (CIF). A CIF indicates a DL CC or a UL CC scheduled through the DCI. For example, the second PDCCH 711 can include a CIF indicating the DL CC #2. The third PDCCH 721 can include a CIF indicating the UL CC #3.

Also, the CIF of the third PDCCH 721 can take a CIF value corresponding to a DL CC rather than the CIF value corresponding to a UL CC. In other words, as the CIF of the third PDCCH 721 indicates the DL CC #3 linked to the UL CC #3, the PUSCH can indirectly indicate a scheduled UL CC #3. It is because if the DCI of a PDCCH includes PUSCH scheduling and the CIF indicates a DL CC, a UE can determine that the above situation corresponds to the PUSCH scheduling on a UL CC linked to a DL CC. Therefore, by using a CIF having a limited bit length (e.g., a CIF having three-bit length), a larger number of CCs can be indicated than a method for informing of all the DL/UL CCs.

A UE using cross-carrier scheduling is required to monitor a PDCCH of a plurality of scheduled CCs with respect to the same DCI format in a control region of one scheduling CC. For example, if a plurality of DL CCs have different transmission modes, each DL CC can monitor a plurality of PDCCHs having different DCI formats. Even if the same transmission mode is used for the plurality of DL CCs, as long as the bandwidth of each DL CC varies from one another, the size of payload of the DCI format is different under the same DCI format and a plurality of PDCCHs can be monitored.

Consequently, if cross-carrier scheduling is possible, a UE is required to monitor a PDCCH for a plurality of DCI in the control region of a monitoring CC according to the transmission mode and/or the bandwidth of each CC. Therefore, it is required to construct a search space which can support the PDCCH monitoring and to monitor the PDCCH.

First, in a multiple carrier system, the following terminologies are defined.

A UE DL CC set: a set of DL CCs scheduled for a UE to receive a PDSCH.

A UE UL CC set: a set of UL CCs scheduled for a UE to transmit a PUSCH.

A PDCCH monitoring set: A set of at least one DL CC performing PDCCH monitoring. A PDCCH monitoring set may be the same as the UE DL CC set or a subset of the UE DL CC set. A PDCCH monitoring set can include at least one of DL CCs in the UE DL CC set. Similarly, a PDCCH monitoring set can be defined separately independent of the UE DL CC set. A DL CC included in the PDCCH monitoring set can be configured such that self-scheduling for a linked UL CC is always possible.

The UE DL CC set, the UE UL CC set, and the PDCCH monitoring set can be configured to be cell-specific or UE-specific.

Figure 10:
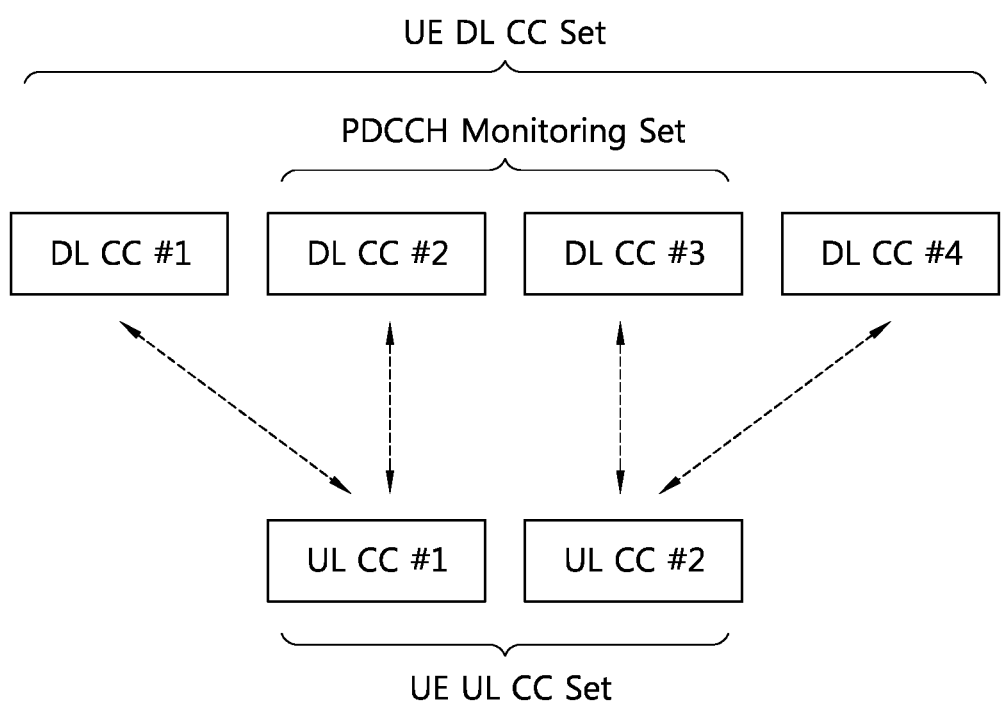
FIG. 10 is one example of a set of CCs.

FIG. 10 is one example of a set of CCs. It is assumed that four DL CCs (DL CC #1, #2, #3, #4) from the UE DL CC set are allocated to a UE; two UL CCs (UL CC #1, #2) from the UE UL CC set are allocated to the UE; and two DL CCs (DL CC #2, #3) from the PDCCH monitoring set are allocated to the UE.

The DL CC #2 in the PDCCH monitoring set transmits a PDCCH about a PDSCH of the DL CC #1/#2 in the UE DL CC set and a PDCCH about a PUSCH of the UL CC #1 in the UE UL CC set. The DL CC #3 in the PDCCH monitoring set transmits a PDCCH about a PDSCH of the DL CC #3/#4 in the UE DL CC set and a PDCCH about a PUSCH of the UL CC #2 in the UE UL CC set.

A linkage can be established among CCs included in the UE DL CC set, the UE UL CC set, and the PDCCH monitoring set. In the example of FIG. 10, a PDCCH-PDSCH linkage is established between a scheduling CC, DL CC #2 and a scheduled CC, DL CC #1; and a PDCCH-PUSCH linkage is established between DL CC #2 and UL CC #1. Also, a PDCCH-PDSCH linkage is established between a scheduling CC, DL CC #3 and a scheduled CC, DL CC #4; and a PDCCH-PUSCH linkage is established between DL CC #3 and UL CC #2. A BS can inform the UE of information about the scheduling CC or the PDCCH-PDSCH/PUSCH linkage information through cell-specific signaling or terminal-specific signaling.

On the other hand, for the respective DL CCs in the PDCCH monitoring set, a DL CC and a UL CC may not be linked to each other. After linking a DL CC in the PDCCH monitoring set to a DL CC in the UE DL CC set, a UL CC for PUSCH transmission can be limited to a UL CC linked to a DL CC in the UE DL CC set.

A CIF can be set differently according to linkage of the UE DL CC set, the UE UL CC set, and the PDCCH monitoring set.

Figure 11:
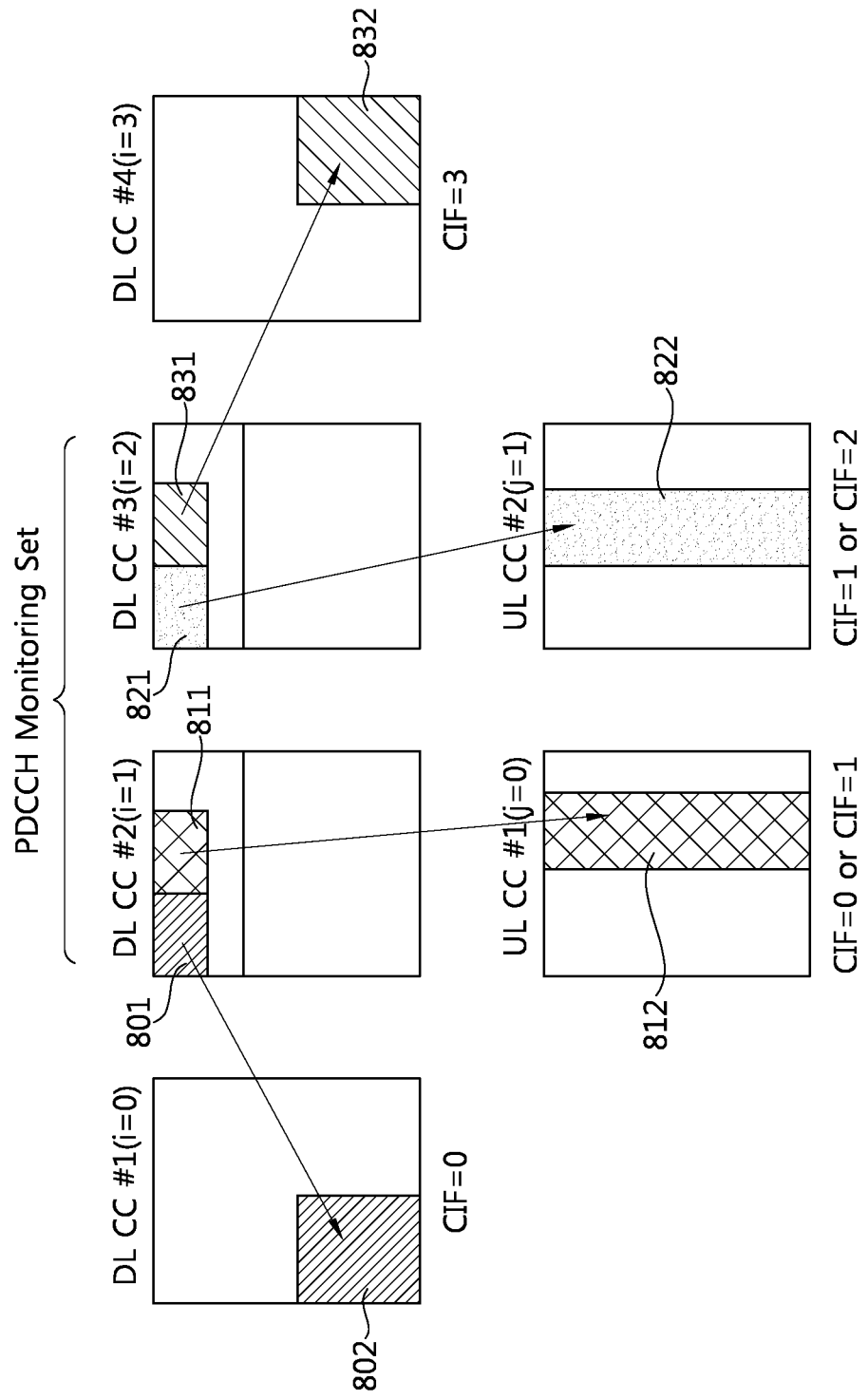
FIG. 11 is one example of CIF setting.

FIG. 11 is one example of CIF setting. The example shows four DL CCs indexed with 0 to 3, denoted by i. The example also includes two UL CCs indexed with 0 and 1, denoted by j. Linkage for the UE DL CC set, the UE UL CC set, and the PDCCH monitoring set is the same as the example of FIG. 10.

A first PDCCH 801 of the DL CC #2 indicates the PDSCH 802 of the DL CC #1. The CIF in the first PDCCH 801 is 0, indicating the index of the DL CC #1.

A second PDCCH 811 of the DL CC #2 indicates the PUSCH 812 of the UL CC #1. The CIF in the second PDCCH 811 is 0, indicating the index of the UL CC #1. If DL CC and UL CC have a CIF value independent of each other, the CIF value is configured to be 0 to indicate the UL CC #1. Additionally, a flag field indicating whether a received DCI is a downlink grant or a uplink grant can be included in the second PDCCH 811. Similarly, the CIF in the second PDCCH 811 may indicate the DL CC linked to the UL CC #1. Since the UL CC #1 is linked to the DL CC #1 or the DL CC #2 herein, the CIF in the second PDCCH 811 is either zero, indicating the DL CC #1 linked to the UL CC #1 or one, indicating the DL CC #2 linked to the UL CC #1. A UE can figure out that the second PDCCH 811 includes a uplink grant and corresponds to a PDCCH about the UL CC #1 linked to the DL CC #1 or the DL CC #2.

If the CIF is configured to indicate a DL CC linked to a UL CC, the CIF doesn't have to indicate the index of the UL CC but is configured to always indicate the index of the DL CC. Therefore, it may be argued that the index of a UL CC is determined according the index of a linked DL CC. A UE can figure out whether the CIF indicates a DL CC or a DL CC linked to a UL CC according to whether a resource assignment in the PDCCH is a downlink grant or a uplink grant.

A first PDCCH 821 of the DL CC #3 indicates a PDSCH 822 of the UL CC #2. The CIF in the first PDCCH 821 is set to be 1, indicating the index of the UL CC #2; or it can be set to be 2 (or 3), indicating the DL CC #3 (or the DL CC #4) linked to the UL CC #2.

A second PDCCH 831 of the DL CC #3 indicates a PDSCH 832 of the DL CC #4. The CIF in the first PDCCH 831 is 3, indicating the index of the DL CC #4.

Figure 12:
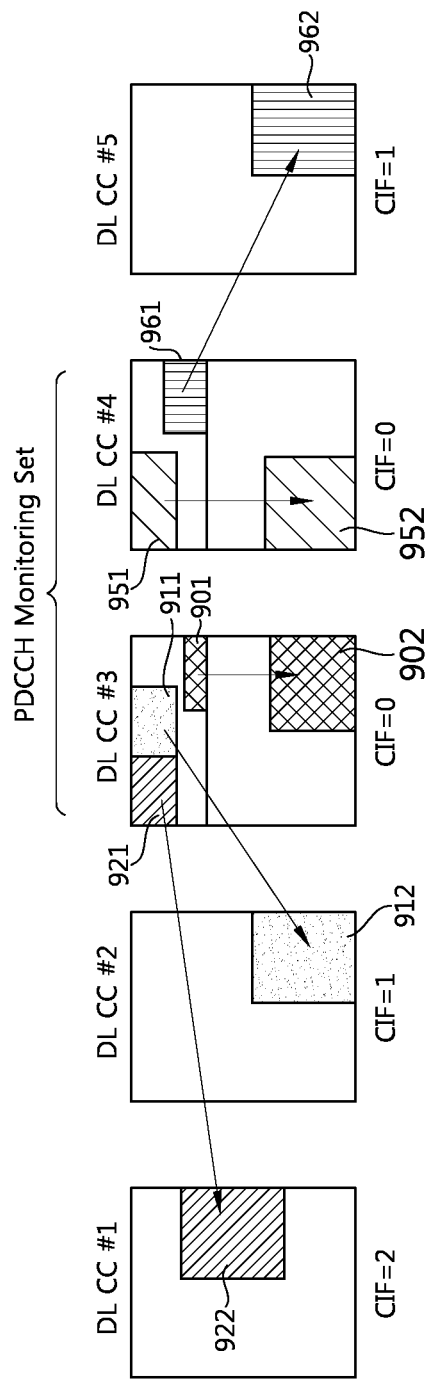
FIG. 12 is another example of CIF setting.

FIG. 12 is another example of CIF setting. FIG. 12 includes five DL CCs and a PDCCH monitoring set includes DL CC #3 and DL CC #4. Different from the embodiment of FIG. 11, the CIF has a relative index value with respect to a monitoring CC through which a PDCCH is transmitted. In other words, different from the embodiment of FIG. 11, where the CIF value for a DL CC #1, #2, #3, and #4 was assigned 0, 1, 2, and 3 independent of a monitoring CC through which the PDCCH is transmitted and the PDCCH-PDSCH/PUSCH linkage, a relative CIF value is assigned to each DL CC with respect to the monitoring CC.

A scheduled DL CC linked to the DL CC #3 is DL CC #1, DL CC #2, and DL CC #3. DL CC #3, #1, and #2 are assigned with 0, 1, and 2, respectively as an index for CIF. The scheduled DL CC linked to the DL CC #4 is DL CC #4 and DL CC #5. Therefore, the DL CC #4 and #5 are assigned with 0 and 1 as an index for CIF.

In the figure, the CIF value is assigned to each scheduling CC in the ascending order with respect to a monitoring CC, but the CIF can also be assigned in the descending order.

A first PDCCH 901 of the DL CC #3 indicates a PDSCH 902 of the DL CC #3. The CIF in the first PDCCH 901 is 0. A second PDCCH 911 of the DL CC #3 indicates a PDSCH 912 of the DL CC #2. The CIF in the second PDCCH 911 is 1. A third PDCCH 921 of the DL CC #3 indicates a PDSCH 922 of the DL CC #1. The CIF in the third PDCCH 921 is 2.

A first PDCCH 951 of the DL CC #4 indicates a PDSCH 952 of the DL CC #4. The CIF in the PDCCH 951 is 0. A second PDCCH 961 of the DL CC $4 indicates a PDSCH 962 of the DL CC #5. The CIF in the second PDCCH 961 is 1.

By setting the CIF value with respect to a monitoring CC, the CIF can indicate all the DL CCs with a smaller number of bits than the number of bits representing the total number of DL CCs.

As described above, a method for assigning a CIF value independently for a PDCCH monitoring CC and a DL-UL linkage provides an advantage that much more CCs can be indicated by using a CIF having a limited bit length.

A monitoring CC can also be used as a reference for the CIF to indicate a UL CC for a PUSCH. In a similar way, the UL CC can be indicated indirectly as the CIF indicates a DL CC linked as described above.

Now, a method for configuring a plurality of UE-specific search spaces according to an embodiment of the present invention will be described.

As shown in Table 1, in the 3GPP LTE system, a UE-specific search space defines six PDCCH candidates for each of the aggregation level 1 and 2; and defines two PDCCH candidates for each of the aggregation level 4 and 8. A common search space defines four PDCCH candidates for the aggregation level 4 and two PDCCH candidates for the aggregation level 8. This configuration is based on a single carrier and assumes that case where the same CC is used for transmission of the PDCCH-PDSCH.

In a multiple carrier system capable of cross-carrier scheduling, since multiple PDCCHs to be received by one UE can be transmitted through a single DL CC, chances are that the multiple PDCCHs may not be scheduled or a PDCCH blocking probability becomes high if only the number of existing PDCCH candidates is considered. It is because the number of PDCCHs that can be transmitted to a single DL CC is limited due to the number of PDCCH candidates although a more number of PDCCHs should be transmitted than the existing 3GPP LTE. Accordingly, flexibility for scheduling multiple PDCCHs may be degraded and the PDCCH blocking probability may be increased. The PDCCH blocking probability denotes a probability that PDCCH scheduling is not performed as search spaces for multiple UEs overlap.

Moreover, in a multi-cell environment such as a heterogeneous network, if a PDCCH-less CC is incorporated for interference coordination, it is probable that a large number of PDCCHs are concentrated on a particular DL CC. Thus, it may be difficult to accommodate scheduling a larger number of PDCCHs in a control region for a given size of a search space.

In a multiple carrier system, an extended search space is disclosed for extending the size of an insufficient search space when cross-carrier scheduling is employed.

If cross-carrier scheduling is employed, multiple PDCCHs for one UE can be transmitted from a single DL CC. Accordingly, multiple UE-specific search spaces corresponding to a plurality of scheduled CCs are defined.

The number of UE-specific search spaces can be increased in proportion to carrier aggregation capability, blind decoding capability, or the number of scheduled CCs that can be scheduled on one monitoring CC of a UE.

For example, through higher layer signaling such as RRC signaling, a BS informs a UE of information about CCs available (e.g., information about UE DL CC set, UE UL CC set, PDCCH monitoring set). A UE constructs a plurality of UE-specific search spaces based on the number of allocated CCs and/or the number (which is referred to as Xq) of scheduled CCs that can be scheduled on a PDCCH monitoring CC. A UE monitors PDCCH for a scheduling CC corresponding to each of a plurality of UE-specific search spaces.

To construct a plurality of UE-specific search spaces, the following information can be employed:

(1) The number of CCs available;

(2) The number of DL CCs within a UE DL CC set and/or the number of UL CCs within a UE UL CC set;

(3) CC index (CC index of DL CC within a UE DL CC set or CC index of UL CC within a UE UL CC set);

(4) The number Xq of scheduled CCs that can be scheduled on a PDCCH monitoring CC and CC index c (c=0, 1, . . . , Xq−1) of a scheduled CC;

(5) The number $X^d q$ of DL CCs that can be scheduled on a PDCCH monitoring CC and/or CC index cd (cd=0, 1, . . . , $X^d q$−1) of a scheduled DL CC;

(6) The number $X^u q$ of UL CCs that can be scheduled on a PDCCH monitoring CC and/or CC index cu (cu=0, 1, . . . , $X_u q$−1) of a scheduled UL CC; and (7) The number $X^d q$ of DL CCs that can be scheduled on a PDCCH monitoring CC and the number of UL CCs linked to the corresponding DL CCs.

A UE can obtain the information of (1) to (7) from system information, RRC signaling and/or information received from a BS through PDCCH.

Figure 13:
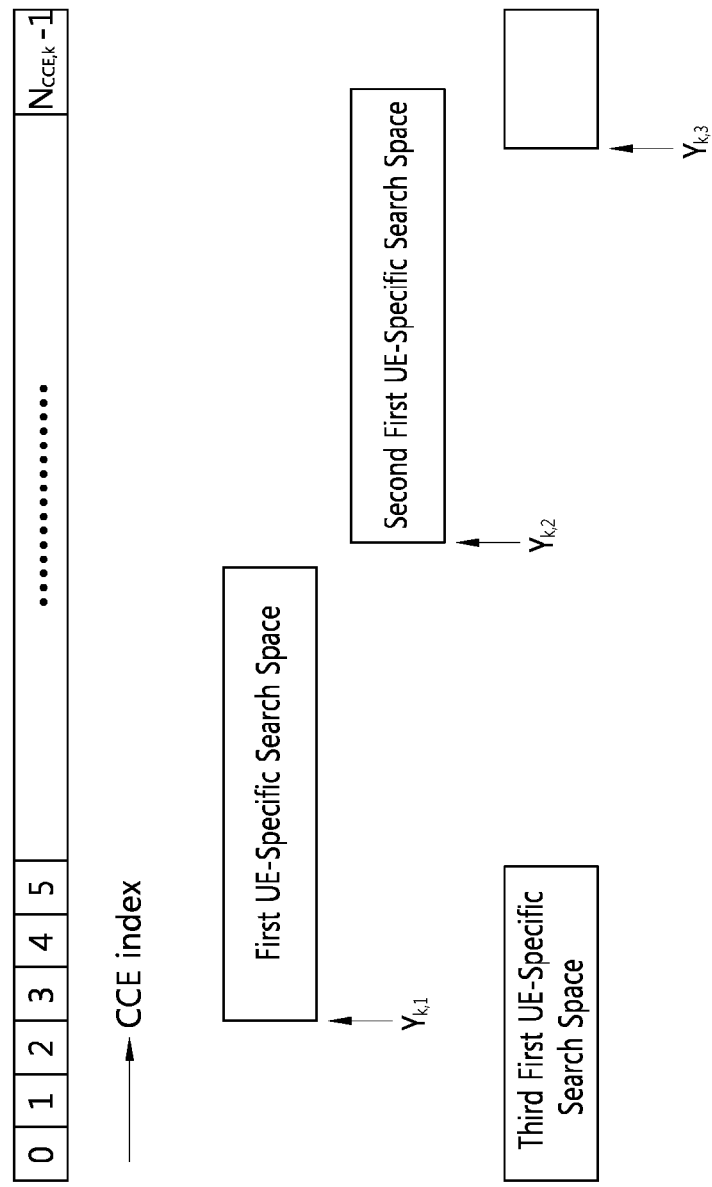
FIG. 13 illustrates a plurality of UE-specific search spaces according to one embodiment of the present invention.

FIG. 13 illustrates a plurality of UE-specific search spaces according to one embodiment of the present invention. For a subframe k, in a CCE column indexed with CCE index of 0 to $N_{CCE,k}$−1, a first UE-specific search space, a second UE-specific search space, and a third UE-specific search space are defined. The number, positions, and sizes of UE-specific search spaces are only examples and are not limited by the illustration.

As shown in equations 1 and 2, in the 3GPP LTE, a start point of search space is selected as a reference to define search space.

$Y_{k,p}$ is a start point of a p-th UE-specific search space. Now, by using at least one of information (1) to (7) listed above, a method for defining a start point of a UE-specific search space and the UE-specific search space will be described.

In a first embodiment, based on the number of CCs allocated for each UE, a start point $Y_{k,i}$ of a i-th UE-specific search space can be defined. If the number of CCs allocated to a UE is N, by using i (i=0, 1, . . . , N−1), a start point $Y_{k,i}$ of the i-th UE-specific search space can be defined as follows.

$Y_{k,i} = \{(A \cdot (Y_{k-1} + i))\} \bmod D$ or $Y_{k,i} = \{A \cdot Y_{k-1} + i\} \bmod D$ [Equation 3]

Here, i=0, 1, . . . , N−1; $n_s$ is a slot number within a radio frame; k=floor($n_s$/2); $Y_{k-1}$ is a value given from UE ID (e.g., C-RNTI); and A and D parameters can use the values of equation. 2.

round(x) is a function that rounds off to the nearest integer. ceil(x) is a function that returns the minimum value from integers larger than or equal to x. floor(x) is a function that returns the maximum value from integers smaller than or equal to x.

Calculating a start point as shown in equation 3 may cause a problem such that UEs with similar UE IEs are made to have the same start point. For example, a first UE with UE ID=3 and i=2 and a second UE with ID=5 and i=0 are made to have the same start point. To solve the problem, $Y_{k-1}$ can be set as a multiple of UE ID. For example, $Y_{k-1}$=UE ID*Y, where Y is an integer. If Y is so selected to be more than the maximum number of CCs that can be allocated for a UE, the problem that start points are overlapped due to similar UE IDs can be prevented.

In a second embodiment, a start point $Y_{k,j}$ of a j-th UE-specific search space can be defined based on CC index or CIF of a CC allocated for each UE. The start point can be defined as follows.

$Y_{k,j} = \{(A \cdot (Y_{k-1} + j))\} \bmod D$ or $Y_{k,j} = (A \cdot Y_{k-1} + j) \bmod D$ [Equation 4]

Here, j denotes at least one of CC index (or CIF) of each DL CC within a UE DL CC set, CC index (or CIF) of all the CCs within a UE DL/UL CC set, and the total number of DL CCs and UL CCs that can be scheduled on a PDCCH monitoring CC. In this case, too, by setting $Y_{k-1}$=UE ID*Y, a probability that UE-specific search spaces overlap among UEs can be reduced.

In a third embodiment, based on the number Xq of scheduled CCs that can be scheduled on a PDCCH monitoring CC, a start point $Y_{k,c}$ of a c-th UE-specific search space can be defined. The start point can be defined as follows.

$Y_{k,c} = \{(A \cdot (Y_{k-1} + c))\} \bmod D$ or $Y_{k,c} = (A \cdot Y_{k-1} + c) \bmod D$ [Equation 5]

Here, c is CC index of a CC scheduled on a PDCCH monitoring CC, where c=0, 1, . . . , Xq−1. Xq is the number of scheduled CC that can be scheduled on a PDCCH monitoring CC. In this case, too, by setting $Y_{k-1}$=UE ID*Y, a probability that UE-specific search spaces overlap among UEs can be reduced.

In the same way, based on CC index $c^d$ ($c^d$=0, 1, . . . , $X^d q$−1) of a scheduled DL CC or CC index $c^u$ ($c^u$=0, 1, . . . , $X^u q$−1) of a scheduled UL CC, a start point of a UE-specific search space for a $c^d$-th or a $c^u$-th CC can be defined.

In a fourth embodiment, a start point $Y_{k,p}$ of a p-th UE-specific search space can be defined based on a CC-specific parameter $p_c$. The start point can be defined as follows.

$Y_{k,p} = \{(A \cdot (Y_{k-1} + p_c))\} \bmod D$ or $Y_{k,p} = (A \cdot Y_{k-1} + p_c) \bmod D$ [Equation 6]

The CC-specific parameter $p_c$ can be defined as a parameter specific to a CC from one of the information (1) to (7) listed above.

Meanwhile, without defining a start point separately, by using search space appearing in EQ. 1, a UE-specific search space $S^{(L)}_{k,p}$ about a p-th CC can be defined. That is, the area of UE-specific search space $S^{(L)}_{k,p}$ for a p-th CC can be calculated as follows.

$S_{k,p}^{(L)} = L \cdot \{(Y_k + m + f(p)) \bmod \lfloor N_{CCE,k}/L \rfloor\} + i$ or $S_{k,p}^{(L)} = L \cdot \{((Y_k + m) \cdot f(p)) \bmod \lfloor N_{CCE,k}/L \rfloor\} + i$ [Equation 7]

Here, m=0, 1, . . . , $M^{(L)}$−1; i=0, 1, . . . , L−1; and $M^{(L)}$ is the number of PDCCH candidates for a CCE aggregation level L. f(p) is a CC-specific parameter and can be defined by one of the information (1) to (7) listed above.

A plurality of UE-specific search spaces can overlap with one another. Overlap of a search space occurs as a start point of a UE-specific search space is located within another UE-specific search space.

The size of each UE-specific search space used for PDCCH monitoring of each scheduled CC can be set to be identical to each other.

However, the sizes of a plurality of UE-specific search spaces can be set differently from each other by taking account of bandwidth of each CC, linkage with UL CC, the number of CCs for which the same DCI format payload size is defined, etc.

The size of a UE-specific search space can be calculated from the number $M^{(L)}$ of PDCCH candidates provided for each CCE aggregation level L. The size of a UE-specific search space can be $M^{(L)}$*L. Also, the size of a UE-specific search space can be interpreted as $M^{(L)}$.

One of a plurality of CCs corresponding to a plurality of UE-specific search spaces can be a reference CC. A reference CC can correspond to a self-scheduling CC or a primary CC. The primary CC may correspond to a CC indicated as a primary CC among multiple CCs; or a CC through which fundamental system information is transmitted, being known to both of a BS and a UE as a primary CC.

The size of a UE-specific search space corresponding to a reference CC (which is referred to as a reference UE-specific search space) and that of the remaining UE-specific search space can be set to be different from each other. For example, the size of the reference UE-specific search space can be made larger than that of the remaining UE-specific search space.

The size of a UE-specific search space can be varied according to CCE aggregation level. For example, for CCE aggregation level 1 and 2, the size of a reference UE-specific search space is made to be larger than that of the remaining UE-specific search space. In the case of CCE aggregation level 4 and 8 where the number of PDCCH candidates is not that large, the size of the reference UE-specific search space and that of the remaining UE-specific search space are made to be the same with each other.

More specifically, the number of PDCCH candidates provided by a reference UE-specific search space can be kept to be 6 for CCE aggregation level $\{1, 2\}$ while the number of PDCCH candidates can be kept to be smaller than 6 for the other UE-specific search spaces. The above setting is possible since the number of PDCCH candidates provided by the CCE aggregation level $\{4, 8\}$ is relatively small (which is 2), making it possible for the number of PDCCH candidates to be kept the same for all of the reference UE-specific search space and the other UE-specific search spaces.

By configuring the size of a UE-specific search space differently according to a CCE aggregation level, scheduling flexibility can be improved and overhead due to blind decoding can be reduced.

Although a reference UE-specific search space is defined for all the CCE aggregation levels (e.g., $\{1, 2, 4, 8\}$), the remaining UE-specific search space can be made to be defined only for limited CCE aggregation levels (e.g., $\{1, 2\}$ or $\{4, 8\}$).

The limited CCE aggregation level monitored for the remaining UE-specific search spaces can have a relationship with the CCE aggregation level of a PDCCH which is successful for decoding in the reference UE-specific search space. For example, if PDCCH decoding is successful in the reference UE-specific search space with CCE aggregation level 1, monitoring for CCE aggregation levels adjacent to the CCE aggregation level 1 is performed for the remaining UE-specific search spaces by including the CCE aggregation level 1 in the form of $\{1, 2\}$ or $\{1, 2, 4\}$.

To reduced complexity of blind decoding for a UE, a plurality of UE-specific search spaces can be made to support a smaller number of PDCCH candidates than the number of PDCCH candidates supported by the existing 3GPP LTE as shown in Table 1. For example, the number of PDCCH candidates is defined to have four for each of CCE aggregation levels 1 and 2 while 1 or 2 for each of CCE aggregation levels 4 and 8.

As shown in Table 3, in the 3GPP LTE, DCI format for a uplink grant used for PUSCH scheduling is referred to as DCI format 0. The payload size of DCI format 0 is always the same as that of DCI format 1A for a downlink grant. Therefore, a flag is included in the DCI format 0 and the DCI format 1A to differentiate between the DCI format 0 and the DCI format 1A. Blind decoding is applied to the DCI format 0 and the DCI format 1A in the same search space. That is, different DCI formats are monitored in the same search space.

To support multiple carriers, a new DCI format rather than the DCI format of Table 3 can be additionally defined. Also, bandwidth or a transmission mode can be defined separately for each CC. Therefore, in designing a plurality of UE-specific search space, a uplink grant and a downlink grant monitored in the same search space should be taken into account.

Figure 14:
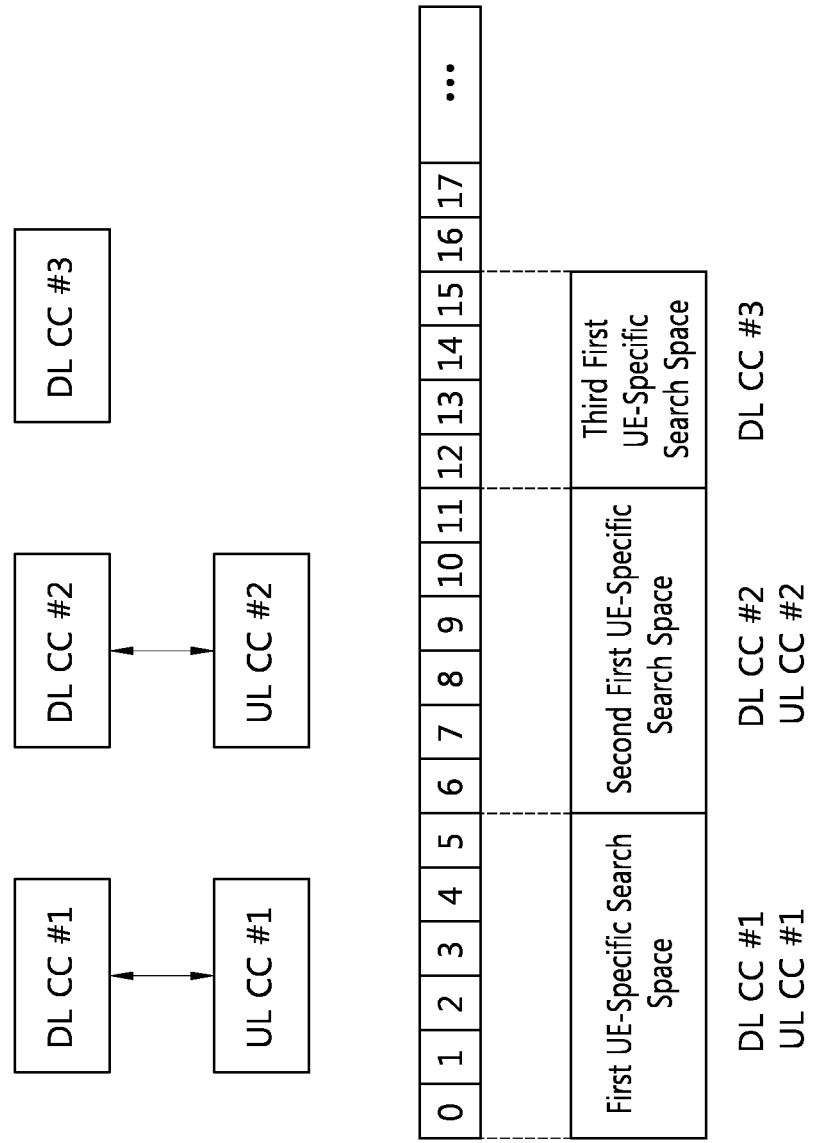
FIG. 14 illustrates an example of a plurality of UE-specific search spaces according to UL/DL linkage.

FIG. 14 illustrates an example of a plurality of UE-specific search spaces according to UL/DL linkage. A first UE-specific search space, a second UE-specific search space, and a third UE-specific search space are defined, not overlapping with one another.

DL CC #1 is linked to UL CC #1 while DL CC #2 is linked to UL CC #2. DL CC #3 is not linked to a UL CC.

The first UE-specific search space is used for monitoring PDCCH for a downlink grant for DL CC #1 and an uplink grant for UL CC #1.

The second UE-specific space is used for monitoring of PDCCH for a downlink grant for DL CC #2 and an uplink grant for UL CC #2.

The third UE-specific search space is used for PDCCH monitoring for a downlink grant for DL CC #3.

A downlink grant and a uplink grant can be all monitored in one UE-specific search space in the same way as the 3GPP LTE. However, some DL CC among a plurality of DL CCs may not be linked to any UL CC. Since the third UE-specific search space is intended for DL CC #3 not linked to a UL CC, it is not necessary for a UE to monitor PDCCH for a uplink grant.

The size of a UE-specific search space used for monitoring both the downlink grant and the uplink grant may be different from the size of a UE-specific search space used for monitoring only the downlink grant (or the uplink grant). For example, although the first and the second UE-specific search space have the same size, the size of the third UE-specific search space is made to be smaller than those of the first and the second UE-specific search space.

Since the third UE-specific search space is allowed only for scheduling of a downlink grant, reducing the size of the third UE-specific search space causes no burden on the scheduling of a BS. In addition, due to the reduced size of the search space, burden from bling decoding imposed on a UE can be reduced.

In the above example, the sizes of the first and the second UE-specific search space are 6 CCE for each and the size of the third UE-specific search space is 4 CCE, but the size of a UE-specific search space and the number of UE-specific search spaces are not limited to the above example.

Now, sharing a plurality of UE-specific search spaces will be described.

If payload sizes in DCI formats to be received are the same, a UE-specific search space can be shared among different CCs.

Figure 15:
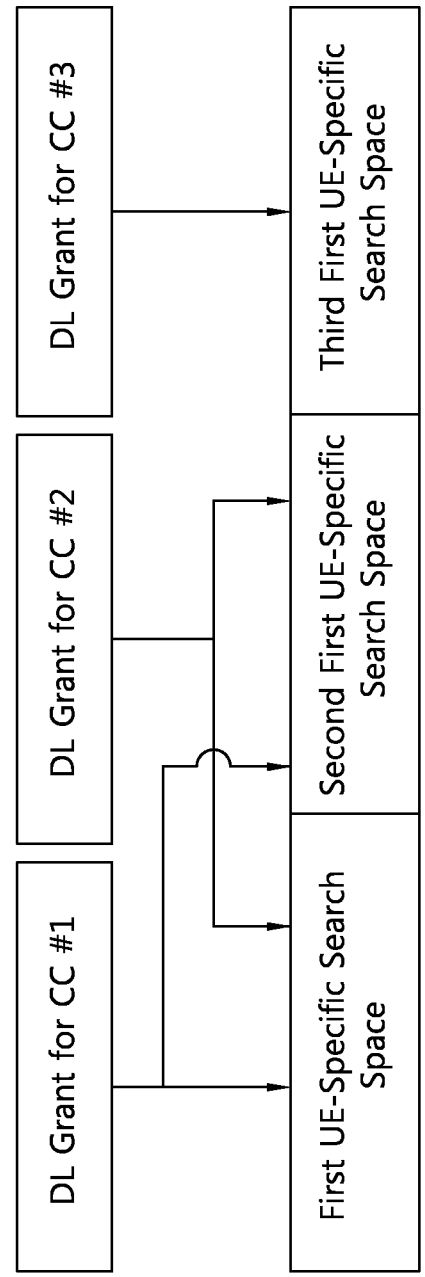
FIG. 15 illustrates one example of sharing search space.

FIG. 15 illustrates one example of sharing search space.

Now, it is assumed that there are three scheduled CCs: CC #1, CC #2, and CC #3.

If CC #1 is selected as a PDCCH monitoring CC and DCI payload sizes of CC #1, CC #2, and CC #3 are the same with one another, search space can be shared.

Individual search spaces are defined for CC #1, CC #2, and CC #3, respectively, if search space is not shared. That is, PDCCH for CC #1 can be scheduled only for the search space of CC #1; PDCCH for CC #2 can be scheduled only for the search space of CC #2; and PDCCH for CC #3 can be scheduled only for the search space of CC #3. If the search spaces are shared as payload sizes of PDCCH DCI transmitted from CC #1, CC #2, and CC #3 are the same, although search spaces are defined for each of CC #1, CC #2, and CC #3, PDCCH for CC #1 can be scheduled through any of the search spaces of CC #1, CC #2, and CC #3. Those search spaces are referred to as shared search space. In the same way, PDCCH for CC #2 and CC #3 can also be scheduled through any of the search spaces of CC #1, CC #2, and CC #3.

If payload size of PDCCH DCI of CC #1 and that of PDCCH DCI of CC #2 are the same with each other, both can be monitored in a first UE-specific search space or a second UE-specific search space. If payload size of PDCCH DCI of CC #3 is different from the PDCCH DCI payload sizes of CC #1 and CC #2, PDCCH DCI of CC #3 can be monitored in a third UE-specific search space.

For example, if payload size of a downlink grant of CC #1 (e.g., DCI format 1A) and that of a uplink grant (e.g., DCI format 0) are the same, both can be monitored in a first or a second UE-specific search space. A downlink grant (e.g., DCI format 1D) of CC #2 having different payload size can be monitored only in a third UE-specific search space.

In other words, by making CCs having the same DCI payload size be scheduled in a separate UE-specific search space or scheduled in a shared UE-specific search space, flexibility can be provided for scheduling of a control channel while avoiding increase of blind decoding complexity.

Sharing search space can be applied for each CCE aggregation level. That is, if DCI payload size is the same, search space can be shared for limited CCE aggregation levels.

For example, although CCE aggregation levels {4, 8} among CCE aggregation levels {1, 2, 4, 8} can have shared space, sharing search space is not allowed for CCE aggregation levels {1, 2}.

More specifically, it is postulated that cross-carrier scheduling is applied to CC #1 and CC #2 and thus, CC #1 and CC #2 are scheduled on a PDCCH monitoring CC #1. Search space for CC #1 is constructed for CCE aggregation levels {1, 2, 4, 8} on the PDCCH monitoring CC #1 while search space for CC #2 is constructed for CCE aggregation levels {1, 2, 4, 8}. Search space for each CC configured on the PDCCH monitoring CC #1 is independent of each other. At this time, if PDCCH DCI payload sizes of CC #1 and CC #2 received by the PDCCH monitoring CC #1 are the same with each other, each PDCCH is monitored only in the search space of each CC for CCE aggregation levels {1, 2}; different from the above, for CCE aggregation levels {4, 8}, PDCCH DCI for CC #1 and #2 is scheduled arbitrarily in the entire search space for CC #1 and CC #2.

Sharing search space according to CCE aggregation level as described above results from the fact that the number of PDCCH candidates is different according to CCE aggregation level. For example, CCE aggregation levels {1, 2} have 6 PDCCH candidates, respectively while CCE aggregation levels {4, 8} have 2 PDCCH candidates for each CCE aggregation level. Since CCE aggregation levels {1, 2} can have more number of PDCCH candidates, increase of scheduling flexibility is not much even though search space is shared. However, increased scheduling flexibility can be obtained due to sharing of search space for CCE aggregation levels {4, 8} where the number of PDCCH candidates is very small (which is 2).

The above embodiments describe communication between a BS and a UE. In the case where a relay is involved, too, technical principles of the present invention can be applied to the communication between a BS and the relay and/or communication between the relay and a UE. If the present invention is applied to the communication between a BS and a relay, the relay can perform the function of a UE. If the present invention is applied to the communication between a relay and a UE, the relay can perform the function of a BS. Unless otherwise indicated, a UE can function as a UE or a relay.

Figure 16:
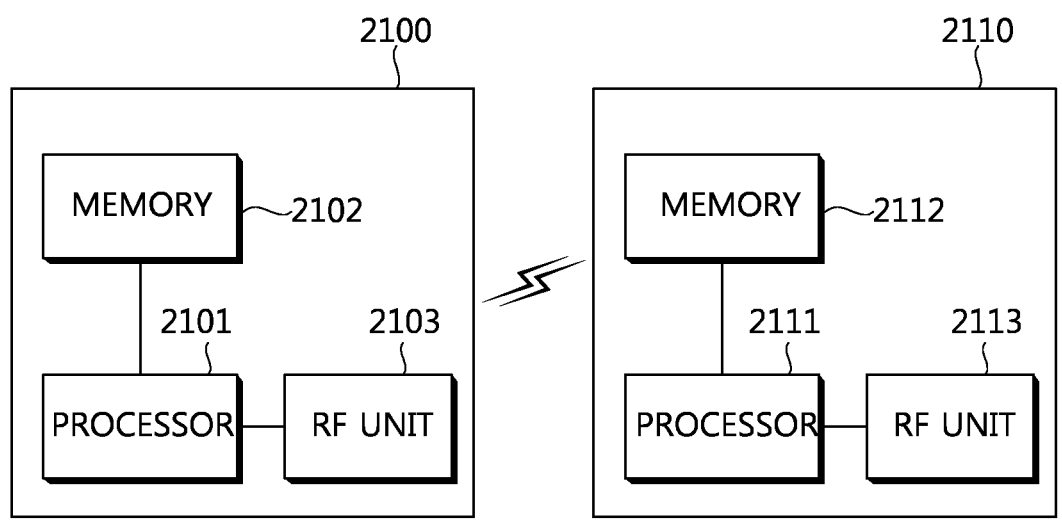
FIG. 16 illustrates a block diagram of a wireless communication system in which an embodiment of the present invention is implemented.

FIG. 16 illustrates a block diagram of a wireless communication system in which an embodiment of the present invention is implemented. The embodiment of a plurality of UE-specific search spaces described above can be implemented by a BS and a UE.

A BS 2100 comprises a processor 2101, a memory 2102, and a radio frequency (RF) unit 2103.

A processor 2101 implements a disclosed function, a disclosed procedure, and/or a disclosed method. In the embodiment described above, operation of a BS can be implemented by the processor 2101. The processor 2101 can support operation for multiple carriers and configure a downlink physical channel in the extended search space described above by using interleaving.

A memory 2102, being connected to the processor 2101, stores protocol or parameters for operation of multiple carriers. An RF unit 2103, being connected to the processor 2101, transmits and/or receives radio signals.

A UE 2110 comprises a processor 2111, a memory 2112, and an RF unit 2113.

The processor 2111 implements a disclosed function, a disclosed procedure, and/or a disclosed method. The operation of a UE in the embodiment described above can be implemented by the processor 2111. The processor 2111 can support operation of multiple carriers and monitor a PDCCH about multiple CCs in an extended search space.

A memory 2112, being connected to the processor 2111, stores protocol or parameters for operation of multiple carriers. An RF unit 2113, being connected to the processor 2111, transmits and/or receives radio signals.

The processor 2101, 2111 can include application-specific integrated circuit (ASIC), other chipsets, logical circuits and/or a data processing apparatus. The memory 2102, 2112 can include read-only memory (ROM), random access memory (RAM), a flash memory, a memory card, storage medium and/or other storage devices. The RF unit 2103, 2113 can include a baseband circuit for processing radio signals. If embodiments are implemented by software, the techniques described above can be implemented in a module (procedures, functions, etc.) which carries out the functions described above. A module can be stored in the memory 2102, 2112 and can be carried out by the processor 2101, 2111. The memory 2102, 2112 can be installed inside or outside the processor 2101, 2111 and can be connected to the processor 2101, 2111 through various well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The above-described embodiments include various aspects of examples. Although all possible combinations for describing the various aspects may not be described, those skilled in the art may appreciate that other combinations are possible. Accordingly, the present invention should be construed to include all other replacements, modifications, and changes which fall within the scope of the claims.

The invention claimed is:

1. A method for monitoring a control channel in a multiple carrier system, the method comprising:
   receiving information related to a carrier indicator field (CIF);
   if an aggregation of carriers is configured, determining a plurality of UE-specific search spaces of a first carrier;
   monitoring a plurality of downlink control channels within the plurality of UE-specific search spaces of the first carrier; and
   receiving downlink control information (DCI) on downlink control channels, which are successfully decoded, via the first carrier,
   wherein a start point for each of the plurality of UE-specific search spaces is determined based on the CIF if the CIF is configured,
   wherein the start point of each of the UE-specific search spaces is different from a start point of a common search space, and
   wherein the DCI received on the downlink control channel of the first carrier includes scheduling information on either a downlink channel or an uplink channel in a second carrier.

2. The method of claim 1, wherein the start point of each of the plurality of UE-specific search spaces is determined based on a number of available carriers.

3. The method of claim 1, wherein the start point of each of the plurality of UE-specific search spaces is determined based on a total number of configured carriers.

4. The method of claim 1, wherein the start point of each of the plurality of UE-specific search spaces is determined based on an index of a corresponding carrier.

5. The method of claim 1, wherein the plurality of UE-specific search spaces all have the same size.

6. The method of claim 1, wherein at least one of the plurality of UE-specific search spaces has a different size from those of the remaining UE-specific search spaces.

7. A user equipment (UE) for monitoring a control channel in a multiple carrier system, the UE comprising:
   a radio frequency unit configured to transmit and receive radio signals; and
   a processor operatively connected to the radio frequency unit and configured to:
   receive information related to a carrier indicator field (CIF);
   if an aggregation of carriers is configured, determine a plurality of UE-specific search spaces of a first carrier;
   monitor a plurality of downlink control channels within the plurality of UE-specific search spaces of the first carrier; and
   receive downlink control information (DCI) on a downlink control channels, which are successfully decoded, via the first carrier,
   wherein a start point for each of the plurality of UE-specific search spaces is determined based on the CIF if the CIF is configured,
   wherein the start point of each of the UE-specific search spaces is different from a start point of a common search space, and
   wherein the DCI received on the downlink control channel of the first carrier includes scheduling information on either a downlink channel or an uplink channel in a second carrier.

8. The UE of claim 7, wherein the start point of each of the plurality of UE-specific search spaces is determined based on a number of available carriers.

9. The UE of claim 7, wherein the start point of each of the plurality of UE-specific search spaces is determined based on a total number of configured carriers.

10. The UE of claim 7, wherein the start point of each of the plurality of UE-specific search spaces is determined based on an index of a corresponding carrier.

11. The method of claim 1, wherein the plurality of UE-specific search spaces are located in one subframe.

12. The method of claim 1, wherein the second carrier is indicated by the CIF.

13. The method of claim 1, the DCI received on the at least one downlink control channel of the first carrier includes the CIF indicating the second carrier.

14. The method of claim 1, further comprising:
   either receiving the downlink channel on the second carrier or transmitting the uplink channel on the second carrier.

15. The UE of claim 7, wherein the plurality of UE-specific search spaces are located in one subframe.

16. The UE of claim 7, wherein the second carrier is indicated by the CIF.

17. The UE of claim 7, the DCI received on the at least one downlink control channel of the first carrier includes the CIF indicating the second carrier.

18. The UE of claim 7, wherein the processor is further configured to either receive the downlink channel on the second carrier or transmit the uplink channel on the second carrier.

* * * * *